United States Patent [19]
Selker

[11] Patent Number: 5,953,425
[45] Date of Patent: Sep. 14, 1999

[54] PERSONAL AREA NETWORK SECURITY LOCK AND RECHARGER COMBINATION APPARATUS FOR EQUIPMENT ACCESS AND UTILIZATION

[75] Inventor: Edwin Joseph Selker, Palo Alto, Calif.

[73] Assignee: International Business Machines Corporation, Armonk, N.Y.

[21] Appl. No.: 08/879,544

[22] Filed: Jun. 20, 1997

[51] Int. Cl.[6] .............................. G07F 7/08; H04L 9/32; H04L 9/00

[52] U.S. Cl. .................................. 380/25; 380/4; 380/9; 380/23; 380/49; 235/380; 235/382; 340/825.31; 340/825.34; 395/186; 395/187.01; 395/188.01

[58] Field of Search ................................. 235/379, 380; 395/186, 187.01, 188.01; 340/31, 825, 34; 380/4, 9, 21, 23, 24, 25, 49, 50, 59

[56] References Cited

U.S. PATENT DOCUMENTS

| | | | |
|---|---|---|---|
| 4,998,279 | 3/1991 | Weiss | 380/23 |
| 5,097,505 | 3/1992 | Weiss | 380/23 |
| 5,168,520 | 12/1992 | Weiss | 380/23 |
| 5,361,062 | 11/1994 | Weiss et al. | 340/825.33 |
| 5,367,572 | 11/1994 | Weiss | 380/23 |
| 5,629,981 | 5/1997 | Nerlikar | 380/25 |
| 5,836,010 | 11/1998 | Kim | 395/186 |
| 5,844,497 | 12/1998 | Gray | 340/825.34 |

OTHER PUBLICATIONS

"Ics for Smartcards", Philips Semiconductors, Product Announcement, no date given.

J. Rae–Dupree, "Can Touch This", San Jose Mercury News, Business Monday, Oct. 21, 1996.

*Primary Examiner*—Bernarr E. Gregory
*Attorney, Agent, or Firm*—James C. Pinter; Jon A. Gibbons; Gunster, Yoakley, Valdes-Fauli & Stewart, P.A.

[57] ABSTRACT

A mechanism is provided, for use with a portable authorization key, such as a "Personal Area Network" (PAN) device, wherein the PAN device is to be carried by a human user and to be used for authorization for the user's use of equipment, such as a computer. Further, the mechanism of the invention is for use in situations where the user is to remain in close proximity to the equipment for a moderate-to-long period of time. The mechanism provides a physical interface for direct coupling with the PAN device. The interface includes a recharge power coupling. When the user begins a session of use of the equipment, HE gets out the PAN device and places it at the physical interface. Authorization to use the equipment is provided through the direct contact. Further, the equipment provides recharge power to the PAN device. Thus, the mechanism of the invention takes advantage of the extended period of time the user remains in close proximity to the equipment, to provide convenient recharging of the PAN device.

20 Claims, 4 Drawing Sheets

PERSONAL AREA NETWORK SECURITY LOCK AND RECHARGER COMBINATION APPARATUS FOR EQUIPMENT ACCESS AND UTILIZATION

FIELD OF THE INVENTION

The invention generally relates to the field of equipment for which secure access and utilization is desirable. More specifically, the invention relates to secure access by authorized users to such equipment. The invention has particular applicability to personal computers and workstations.

BACKGROUND OF THE INVENTION

In today's technological society, there are numerous different types of equipment, used by individuals on a daily basis, which in some fashion or another require security for access and use. Perhaps the most familiar is the automobile, which requires an ignition key for access and use. An authorized individual, such as a car owner, possesses an instrumentality such as a pre-cut key, which (essentially) uniquely fits the lock of the automobile belonging to that individual. Because of his possession of a key, the car owner can freely enter and drive the car. By contrast, an unauthorized person, lacking the key, is prevented from accessing and using the car unless he is prepared to resort to breaking and entering, and car theft.

Automobiles are not the only types of equipment using such access/use keys. Since the advent of personal-sized, desk-top computers and workstations, security measures have developed, to ensure that the computers can be used only by authorized users. In particular, such machines are often designed to have key-operated locking mechanisms. An authorized user will get out his keychain, insert the key into the lock mechanism and turn the key, and thereby enable the computer for use.

Recent generations of computers have been reduced in size, and laptop portable computers, also called "notebook computers," such as IBM Corporation's ThinkPad (™) line of computers, have become commonplace. To facilitate office use at the user's desk, docking stations such as IBM Corporation's Dock I and Dock II docking stations have physically accommodated ThinkPad computers, to provide convenient physical interfacing with monitors, printers, local area networks, etc. Security has also been given consideration here: docking stations also have key locks for allowing the laptop computers to be undocked for transportation.

While such locking mechanisms are familiar, they have the drawback of a certain amount of user inconvenience: the user must keep the key is his possession. The user who happens to leave the key at home when leaving for the office, will be unable to use the computer without going back home to get the key. In less drastic situations, the user is subjected to the inconvenience of getting out the key and going to the trouble of unlocking the computer.

Technology described in, co-assigned U.S. Pat. No. 5,796,827 issued on Aug. 18, 1998 presents an exciting new technique for computer accessing security. A new apparatus, described under the name "Personal Area Network (PAN)," employs the human body as a signal conducting medium, and allows a user carrying a PAN device, the device having a transmitter, to facilitate electronic communication between the PAN device and a PAN receiver, merely by touching the receiver.

The U.S. Pat. No. 5,796,827 is incorporated by reference herein.

In particular, FIG. 13 of the 08/749,865 application, reproduced as FIG. 1 of the present patent application, depicts an application environment in which a user, possessing a PAN device, uses a computer. The following paragraph, quoted from the U.S. Pat. No. 5,796,827, and using numbering consistent with that application, describes how the PAN device is used:

Referring to FIG. 13, the receiver electrode 18 is located underneath a computer keyboard 500. The computer keyboard is normally disabled. When the hand of a person who possesses an authorized Card 5 comes in close proximity to the keyboard, the keyboard is enabled. This arrangement prevents unauthorized people from using the computer. A similar system could be used for cash registers at restaurants and retail stores.

The considerable publicity which greeted IBM's announcement of PAN technology at the Fall 1996 COMDEX trade show demonstrated the high level of interest in the wide variety of possible applications thereof, such as those given in the U.S. Pat. No. 5,796,827.

However, further refinements and enhancements in the use of PAN technology remain to be implemented. For instance, a portable PAN device, to be carried by a user on his person, requires either recharging or battery replacement from time to time.

Conventional battery replacement has well-known drawbacks, such as the inconvenience of replacing batteries, often at inopportune times, the cost of replacement batteries, and the environmental impact of large numbers of discarded dead batteries.

Rechargability has been a popular solution for such electrical appliances. Conventional charging systems, however, have the drawback of requiring that the user allocate time for the recharging process. While the user may find certain time periods, such as overnight, to be convenient for recharging, the device will sometimes require recharging at other, less convenient, times.

Also, such conventional recharging arrangements require that the user leave the PAN device at the recharger for the duration of the recharging. Thus, the user is without the device while it is recharging. Also, the user may forget to take the PAN device from the recharger at a time when he may need it later.

Therefore, there is a need for a convenient mechanism for providing recharging for a PAN device, which provides recharge capability that is convenient, both in time and in place, for the user.

SUMMARY OF THE INVENTION

It is therefore an object of the invention to provide a PAN recharging mechanism.

It is a further object of the invention to provide a recharging arrangement for the PAN device which is convenient, in the sense that the arrangement is usable in the ordinary course of use of the PAN system.

It is a further object of the invention to take advantage of time intervals, of moderate to great length, during which a user makes use of a piece of equipment whose use is enabled by means of the PAN system, for allowing the user's PAN device to recharge during the use interval.

Additionally, it is an objective of the invention to provide a PAN interface which allows for better contact between the user-carried PAN device and the equipment to be used, so that, if through-body communication is weak or otherwise unsatisfactory, then the user may take action to improve the communication.

It is an additional object of the invention to allow a user, whose PAN device might be awkward or uncomfortable to carry on the user's person while the equipment is being used, to temporarily remove the PAN device from his person and place the PAN device in more direct contact with the equipment while the user uses the equipment.

To achieve these and other objects, there is provided, in accordance with the invention, a system for providing an electrical recharge to an access/use key, such as a PAN device module, in connection with communication therewith.

The system comprises the following components:

A piece of equipment, such as a computer, includes an interface for receiving a user authorization key, such as a PAN device. The equipment preferably includes communication circuitry for communicating with the PAN device, generally as described in the co-pending U.S. Pat. No. 5,796,827. The communication circuitry operates, generally as described therein, to provide access/use authorization.

In accordance with the invention, the interface further includes an electrical power coupling arrangement for providing power, preferably generated internally to the piece of equipment, for recharging the PAN device. The PAN device has a power input suitably arranged to couple with the power coupling arrangement on the piece of equipment. The PAN device further includes means for receiving power, input through the power input, and storing that received power, thereby recharging.

As the user commences using the equipment, he places his/her PAN device on the interface of the piece of equipment, so that the power coupling and the power input are coupled. During the period of time that the user is using the equipment, the PAN device receives the power.

In preferred embodiments, such as computer systems, in which the computer includes a user interface device such as a keyboard, the equipment interface is preferably mounted on the interface device, to facilitate easy access by the user.

A system in accordance with the invention advantageously reduces the user's need to recharge the PAN device or replace its batteries.

DESCRIPTION OF THE PREFERRED EMBODIMENT

In accordance with the invention, an authorized user enables a piece of equipment, such as a computer, for operation using a "Personal Area Network" system as described in, co-assigned U.S. Pat. No. 5,796,827, "System and Method for Near-Field Human-Body Coupling for Encrypted Communication with Identification Cards." Accordingly, that co-pending patent application, with all of its disclosure in its entirety, is incorporated by reference into the present patent application.

In the discussion which follows, certain terminology will be used, for clarity of presentation and for consistency with the illustrated examples. However, it will be understood that the invention more broadly covers a wide variety of equivalent implementations for different varieties of equipment.

Accordingly, for the purpose of the present specification, the following specific terms will be used:

Where the specification refers to a "PAN device," it is understood that the disclosure is broadly intended to cover any PAN apparatus, transmitter, transceiver, etc., which is to be carried on the person of the user, and which is to communicate with equipment through the user's body when the user touches, or otherwise comes into contact with, the equipment.

Where the specification refers to a "piece of equipment," "equipment," or "computer," it is understood that the disclosure is broadly intended to cover any equipment which is to communicate, in any fashion, with a PAN apparatus, transmitter, transceiver, etc., when the user carrying the PAN device comes into physical, i.e., electrical, contact or coupling therewith. The invention has particular applicability to computers, but other equipment, such as cash registers, photocopiers, etc., also fall within the spirit and scope of the invention. In general, any type of equipment falls within the spirit and scope of the invention, whose normal use involves the presence of the user for a length of time sufficient to allow total or partial recharging of the PAN device.

Where the specification refers to an "interface device" or the like, it is understood that the disclosure is broadly intended to cover any distinct portion, module, etc., of an overall system (referred to overall as "equipment"), wherein the portion, module, etc., is normally in the presence of the user. Moreover, it is understood that the description makes no requirement that the equipment include an ascertainably separate interface device, such as a computer keyboard. Rather, for other devices within the spirit and scope of the invention, such as cash registers, photocopiers, and the like, a user interface module, such as a control panel, is integrated within the equipment itself. In such cases, it will be understood that "interface device" shall then refer to the control panel or other user interface thus integrated within the equipment.

Figure 1:
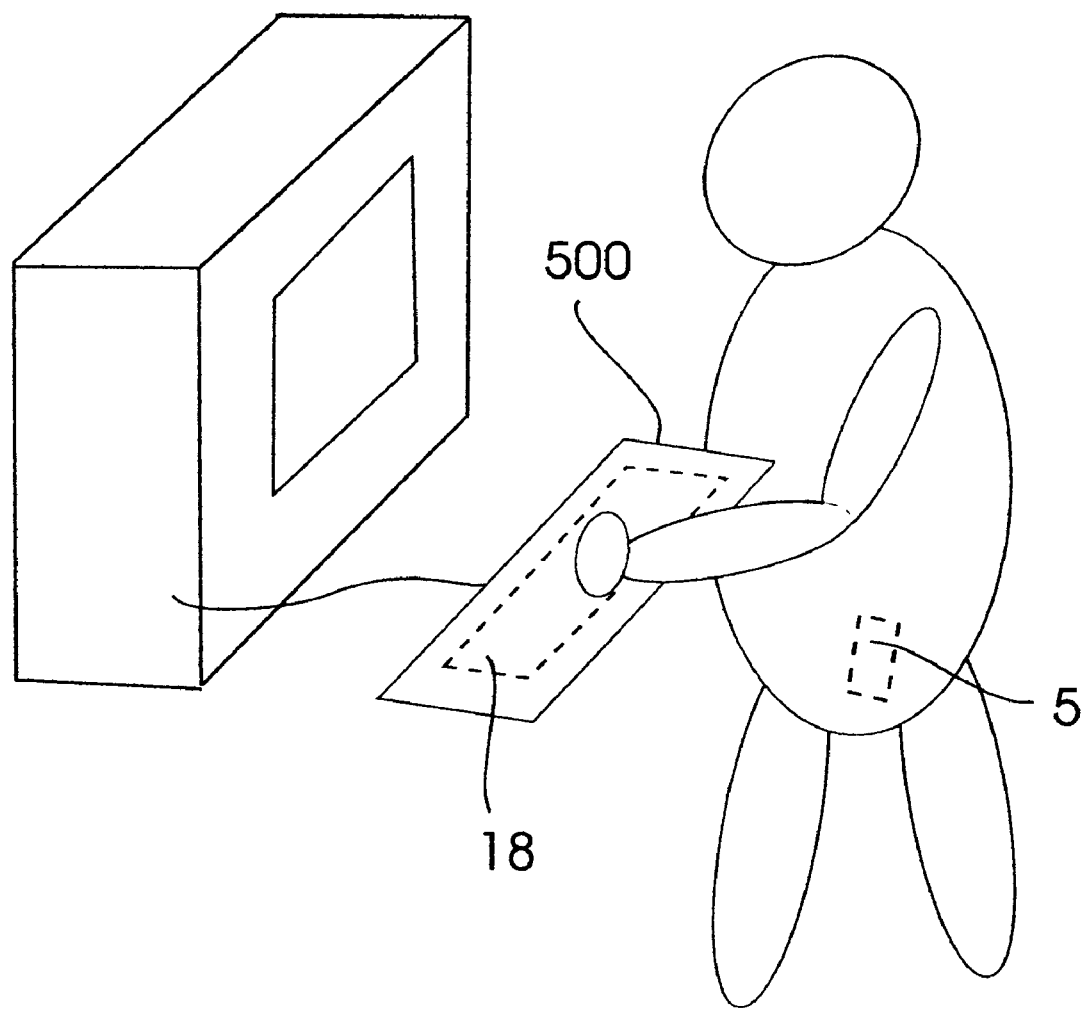
FIG. 1 is a drawing of an operating environment for the invention, depicting a human user operating a computer. This drawing is reproduced from FIG. 13 of co-pending, co-assigned U.S. Pat. No. 5,796,827.
Figure 2:
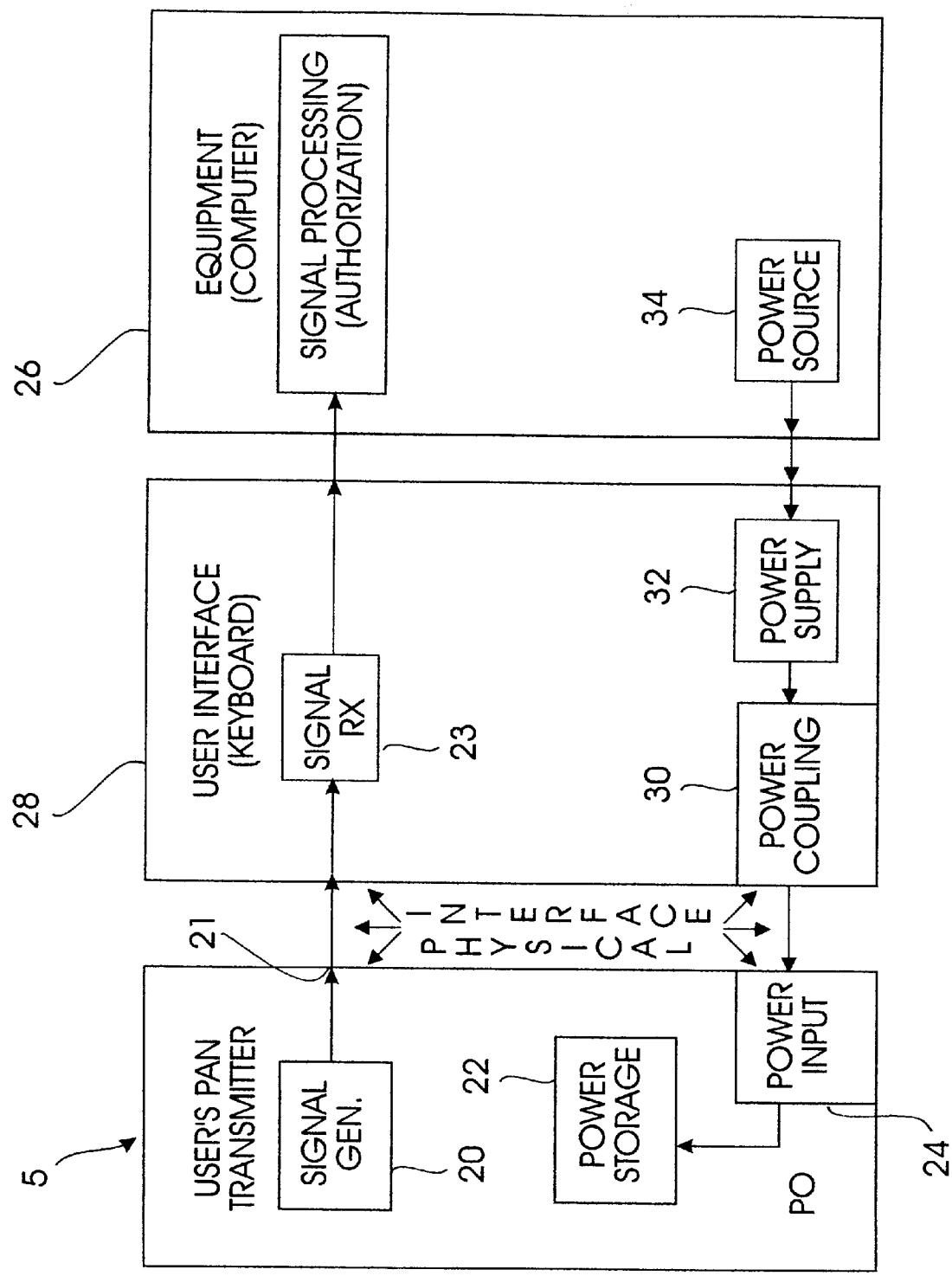
FIG. 2 is a block diagram of a system according to the invention, as the invention is embodied for use in the environment of FIG. 1.

Referring now to FIG. 2, there is shown a block diagram of a system according to the invention. A PAN device 5 includes any suitable physical implementation, such as a credit card-shaped unit to be carried in a user's pocket or wallet. As described in detail in U.S. Pat. No. 5,796,865, the PAN device 5 includes signal generating components. Those components, shown in detail in FIGS. 2 and 3 of the U.S. Pat. No. 5,796,827, are summarized and shown here generally as a signal generator 20, which is coupled to provide a PAN signal (as described in the U.S. Pat. No. 5,796,827) to an output interface 21. From the output interface 21, the signal is carried, by human body coupling or, in accordance with the invention, by direct physical contact, to a signal receiver 23 disposed in the equipment, or, as shown, in a user interface device 28, such as a keyboard. From there, the PAN communication, signal processing, etc., proceeds as described in the U.S. Pat. No. 5,796,827 to perform a user authorization and access function.

As described in co-pending U.S. Pat. No. 5,796,827, particular with reference to FIGS. 4A, 4B, and 4C thereof, the PAN device 5 includes one or more batteries for providing power, preferably six coin-sized lithium cell batteries. In accordance with the present invention, however, replaceable/rechargeable batteries are used, or the PAN device 5 may employ a maintenance-free rechargeable power cell arrangement. These are shown generically in FIG. 2 as power storage 22.

Also in accordance with the invention, there is provided a power input 24. The power input 24 is a physical structure on the surface of the PAN device 5, for allowing convenient coupling with a power source. Power input through the power input 24 is then stored in the power storage 22, for consumption as the PAN device 5 operates.

Further in accordance with the invention, equipment with which the PAN device 5 communicates includes an interface arrangement for direct interfacing with the PAN device 5. As stated above, the interface arrangement may be located on the main body of the equipment. Alternatively, if the equipment includes a separate user interface device to which the user will have particularly intimate access, the interface arrangement is advantageously located thereon.

In the illustrated example, in which a user uses a computer system, the equipment includes a computer, or computer main body, 26. The computer system further includes, as a user interface device, a keyboard 28. A user will make extensive use of the keyboard 28, and remain in close proximity to the keyboard 28, for the duration of the user's use of the computer system.

In accordance with the invention, this time duration affords the user the opportunity to get out the PAN device 5, from a pocket, wallet, etc., and place the PAN device on the recharging interface. The user is likely to remain at the keyboard all the time, so there is little risk that the PAN device 5 will be lost or stolen.

To provide such a power recharging interface, the keyboard 28 includes a power coupling 30. The power coupling 30 includes an electrical interface for providing power, and preferably also includes a physical coupling, such as a socket, for holding the PAN device 5 in place.

Power is provided from the keyboard 28 to the power coupling 30. The ultimate source of the power may be any arrangement which is suitable, given the particular nature of the equipment involved. The power is shown as originating from a power supply 32 within the keyboard 28. If the equipment is an integrated unit, or if the nature of the interface device is such that power may be produced therewithin, then the power supply 32 may be the source of the power.

However, where an interface device such as the keyboard is separate from the remainder of the equipment, it may be the case that the equipment supplies power to the interface device for the interface device's use. See, for instance, a power source 34 in the computer 28. Some of this power may then be diverted to the power coupling 30. In such a configuration, the power supply 32 may be omitted, or it may be implemented as a temporary power storage apparatus.

Figure 3:
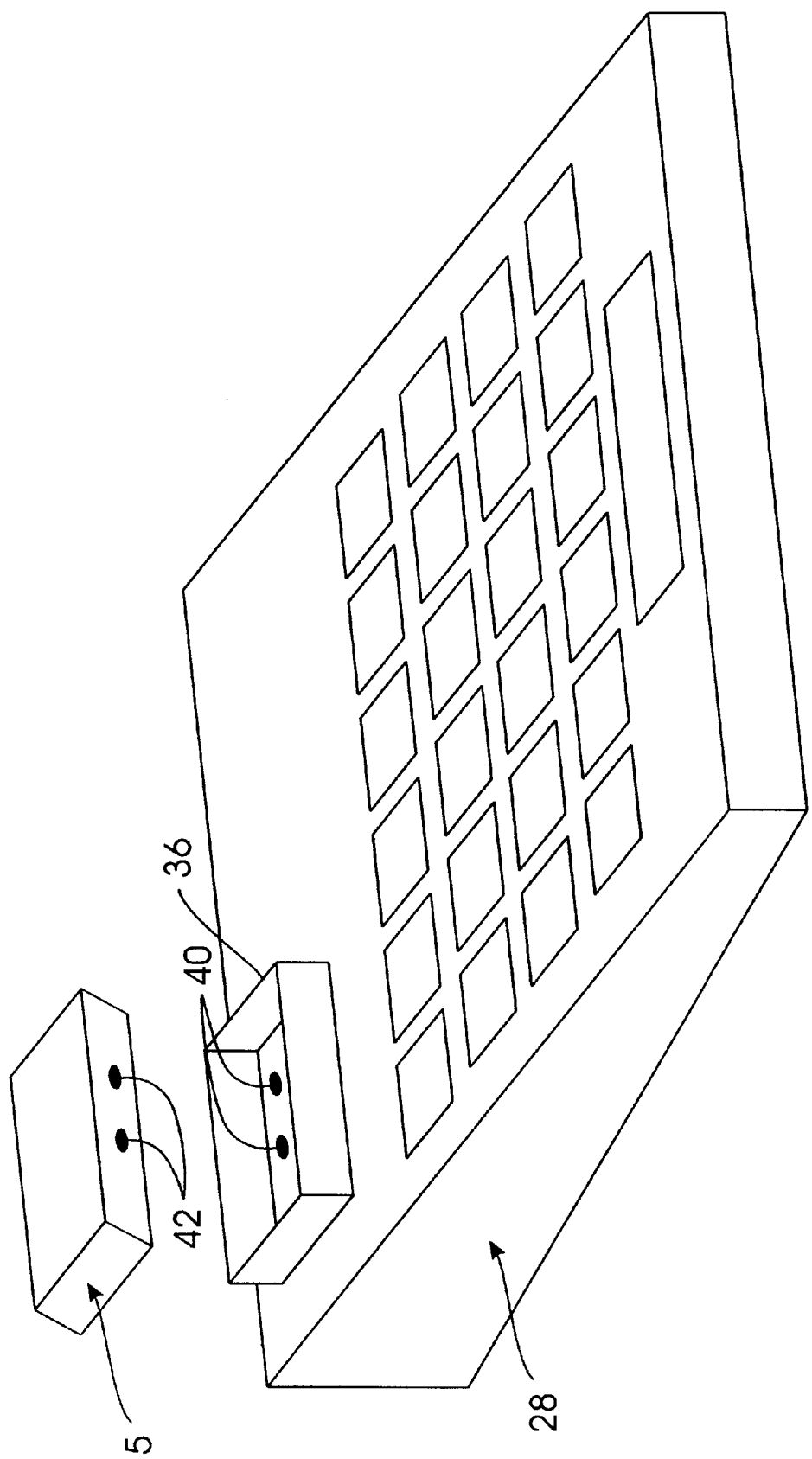
FIG. 3 is a drawing of a computer keyboard having, in accordance with the invention, an interface for receiving a PAN device.

Referring now to FIG. 3, there is shown an illustration of a preferred physical embodiment of the invention.

A perspective view is given of a portion of the keyboard 28. The interface for receiving the PAN device 5, shown as a socket 36, is disposed on the keyboard 28. Preferably, the socket 36 is located conveniently within the user's reach, but out of the way of the user's activities, such as typing at the keyboard 28. In the illustrated example, that convenient but out-of-the-way location is an upper left corner of the keyboard 28.

The socket 36 includes an electrical interface for providing power to the PAN device 5. The electrical interface is shown as electrical contacts 40. Any suitable number of such contacts may be used. Preferably, sufficient contacts 40 are provided to facilitate both power and signal transmission.

The PAN device 5 is shown, in the perspective drawing of FIG. 3, as being positioned above the socket 36, in an exploded illustration. Also, for illustrative purposes, the PAN device 5 is shown as being tipped away from the user, to reveal a lower surface. The PAN device 5's electrical interface, including the power input, is shown on the lower surface as a pair of contacts 42.

For the purpose of illustration in FIG. 3, the contacts 40 and 42 are understood to be schematic representations of the electrical interface between the PAN device 5 and the equipment. Any suitable physical configuration, such as plug-and-socket, male-female, etc., which would be known to persons skilled in the electrical arts, may be used.

Figure 4:
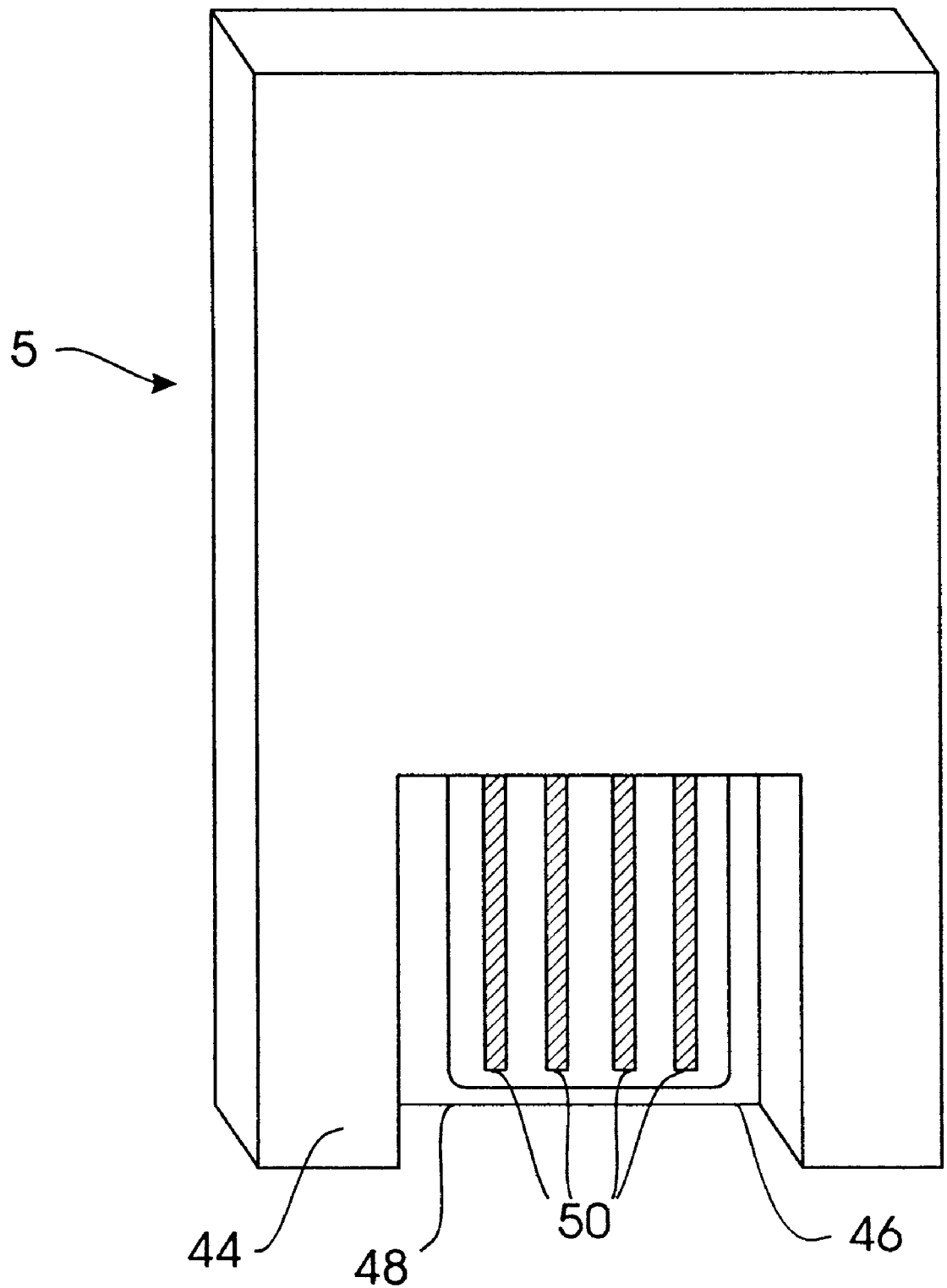
FIG. 4 is a drawing of a PAN device, similar to that of FIG. 3, but showing a more detailed view of a preferred arrangement of electrical contacts.

FIG. 4 is a more detailed illustration of a preferred electrical interface. A preferred embodiment of the PAN device 5 is a thin rectangular card. As shown, the preferred electrical interface is disposed on a socket insertion end 44, i.e., a lower end, of the PAN device 5. Within the lower end is an aperture 46, containing an exposed end of a contact board 48. The contact board 48 preferably includes a printed circuit board 48, bearing electrical contact strips 50.

A suitable mating contact interface, such as an edge connector, is provided in the equipment. The mating contact interface provides power for recharging the PAN device 5. Preferably, a PAN communication interface between the PAN device 5 and the equipment is established as well, for signal transmission. The physical interface may be made through additional contact strips 50, or in any other suitable manner.

Alternatively, the electrical recharging interface may be an inductive coupling, such as is used with rechargeable toothbrushes, razors, etc.

In accordance with the invention, the user gets out his/her PAN device 5 when first sitting down to use the equipment, e.g., a computer. The user installs the PAN device 5 in the receptacle, so that the electrical contacts meet. From then on, the recharging process takes place without requiring the user's further attention.

If the user remains at the equipment lang enough, recharging is complete. However, it will sometimes be the case that the user's period of use of the equipment is not long enough for a complete recharge. Accordingly, the power storage unit 22 should be able to efficiently perform partial discharges and/recharges without degrading, and with good efficiency.

A system according to the invention has two additional advantageous features.

First, it will sometimes be the case that various factors such as ambient electrical noise, poor electrical signal coupling due to excessive layers of material between the user's PAN device and the equipment, etc., will make communication between the PAN device and the equipment difficult.

Also, some embodiments of a PAN device will have directional signal strength characteristics. As a consequence, how a user carries the PAN device (such as inside a wallet, the wallet carried such that the highest directionality side of the PAN device faces away from the user's body) may reduce the PAN device's ability to communicate through the user's body.

A system according to the invention allows the user to cope with such poor communication scenarios by getting the PAN device out and placing it on the interface of the equipment. Thus, enhanced signal strength will lead to better communication.

Second, there may be particular PAN device configurations which the user will find difficult or uncomfortable to carry. For instance, a PAN device would be included within a larger portable apparatus, such as a personal digital assistant (PDA). The user may find it most convenient to simply install the PDA on the equipment interface.

Thus, in these circumstances, the user can take further advantage of enhanced communication, or simple physical convenience, while enjoying the advantageous recharging provided by a system according to the invention.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A user authorization mechanism for a piece of equipment, for operation in concert with a Personal Area Network (PAN) user authorization and communication device provided by a user desiring to use the equipment, the mechanism comprising:

first coupling means for establishing an electrical coupling between the PAN device and the equipment through the user's body;

second coupling means for direct physical coupling of the PAN device to the equipment;

means, operable responsive to electrical coupling the PAN device to the equipment through one of (i) the first coupling means and (ii) the second coupling means, for enabling operation of the piece of equipment; and means, operable responsive to coupling the PAN device to the equipment through the second coupling means, for recharging the PAN device with power provided by the equipment.

2. A mechanism as recited in claim 1, wherein:

the equipment has a user-accessible surface; and the second coupling means includes an interface structure disposed on the user-accessible surface of the equipment.

3. A mechanism as recited in claim 1, wherein:

the equipment includes a user interface input device; and the second coupling means includes an interface structure disposed on the user interface input device.

4. A mechanism as recited in claim 1, wherein:

the piece of equipment includes a computer having a user interface input device, the user interface input device having a user-accessible surface; and the second coupling means includes an interface structure disposed on the user-accessible surface of the user interface input device.

5. A mechanism as recited in claim 4, wherein the user interface input device includes one of (i) a keyboard, and (ii) a mouse.

6. A mechanism as recited in claim 1, wherein the second coupling means includes a physical interfacing having:

(a) a physical receptacle for the PAN device, and (b) an electrical interface, the electrical interface including:

(b.i) a signal interface for receiving data signals from the PAN device, and (b.ii) a recharging interface for providing power to the PAN device.

7. A mechanism as recited in claim 1, wherein the means for coupling includes an edge connector.

8. A mechanism as recited in claim 1, wherein the means for coupling includes an inductive coupling.

9. A piece of equipment, for operation in concert with a Personal Area Network (PAN) user authorization and communication device provided by a user desiring to use the equipment, the equipment comprising:

a user authorization mechanism including:

first coupling means for establishing an electrical coupling between the PAN device and the equipment through the user's body;

second coupling means for direct physical coupling of the PAN device to the equipment;

means, operable responsive to coupling the PAN device to the equipment through one of (i) the first coupling means and (ii) the second coupling means, for enabling operation of the piece of equipment; and means, operable responsive to electrical coupling the PAN device to the equipment through the second coupling means, for recharging the PAN device with power provided by the equipment.

10. A piece of equipment as recited in claim 9, wherein:

the equipment has a user-accessible surface; and the second coupling means includes an interface structure disposed on the user-accessible surface of the equipment.

11. A piece of equipment as recited in claim 9, wherein:

the equipment includes a user interface input device; and the second coupling means includes an interface structure disposed on the user interface input device.

12. A piece of equipment as recited in claim 9, wherein:

the piece of equipment includes a computer having a user interface input device, the user interface input device having a user-accessible surface; and the second coupling means includes an interface structure disposed on the user-accessible surface of the user interface input device.

13. A piece of equipment as recited in claim 12, wherein the user interface input device includes one of (i) a keyboard, and (ii) a mouse.

14. A piece of equipment as recited in claim 9, wherein the second coupling means includes a physical interfacing having:

(a) a physical receptacle for the PAN device, and (b) an electrical interface, the electrical interface including:

(b.i) a signal interface for receiving data signals from the PAN device, and (b.ii) a recharging interface for providing power to the PAN device.

15. A piece of equipment as recited in claim 9, wherein the means for coupling includes an edge connector.

16. A piece of equipment as recited in claim 9, wherein the means for coupling includes an inductive coupling.

17. An electronic communication system comprising:

a portable device, to be carried or worn on a user's person, the portable device including:

(i) means for storing an item of information, (ii) means for producing an encrypted electrical signal representative of the item of information, (iii) a first physical interface for establishing an electrical coupling between the signal from the means for producing and the user's body, (iv) a second physical interface for establishing an electrical coupling between the signal from the means for producing directly and a piece of equipment, and (v) a rechargeable power storage apparatus, The second physical interface including a power interface for receiving power for recharging the rechargeable power storage apparatus; and a piece of equipment including:
  (i) a first physical interface for establishing an electrical coupling between the receiver and the user's body,
  (ii) a second physical interface for establishing a direct physical coupling with the portable device, the second physical interface including a power interface for providing power to the portable device for recharging,
  (iii) means for receiving the encrypted signal through one of the first physical interface and the second physical interface,
  (iv) means for decrypting the signal to obtain the item of information, and
  (v) means for performing an action responsive to the item of information.

18. A system as recited in claim 17, wherein the rechargeable power storage apparatus includes one of (i) a replaceable/rechargeable battery, and (ii) a maintenance-free rechargeable power cell arrangement.

19. A system as recited in claim 17, wherein the power interface includes an edge connector.

20. A system as recited in claim 17, wherein the power interface includes an inductive coupling.

* * * * *

UNITED STATES PATENT AND TRADEMARK OFFICE
CERTIFICATE OF CORRECTION

PATENT NO. : 5,953,425
DATED : September 14, 1999
INVENTOR(S) : Edwin J. Selker

It is certified that error appears in the above-identified patent and that said Letters Patent is hereby corrected as shown below:

On the title page,

Under Attorney, Agent or Firm, please change "James C. Pinter" to --James C. Pintner--

Signed and Sealed this

Fifteenth Day of August, 2000

Attest:

Q. TODD DICKINSON

*Attesting Officer*      *Director of Patents and Trademarks*